United States Patent Office 3,046,238
Patented July 24, 1962

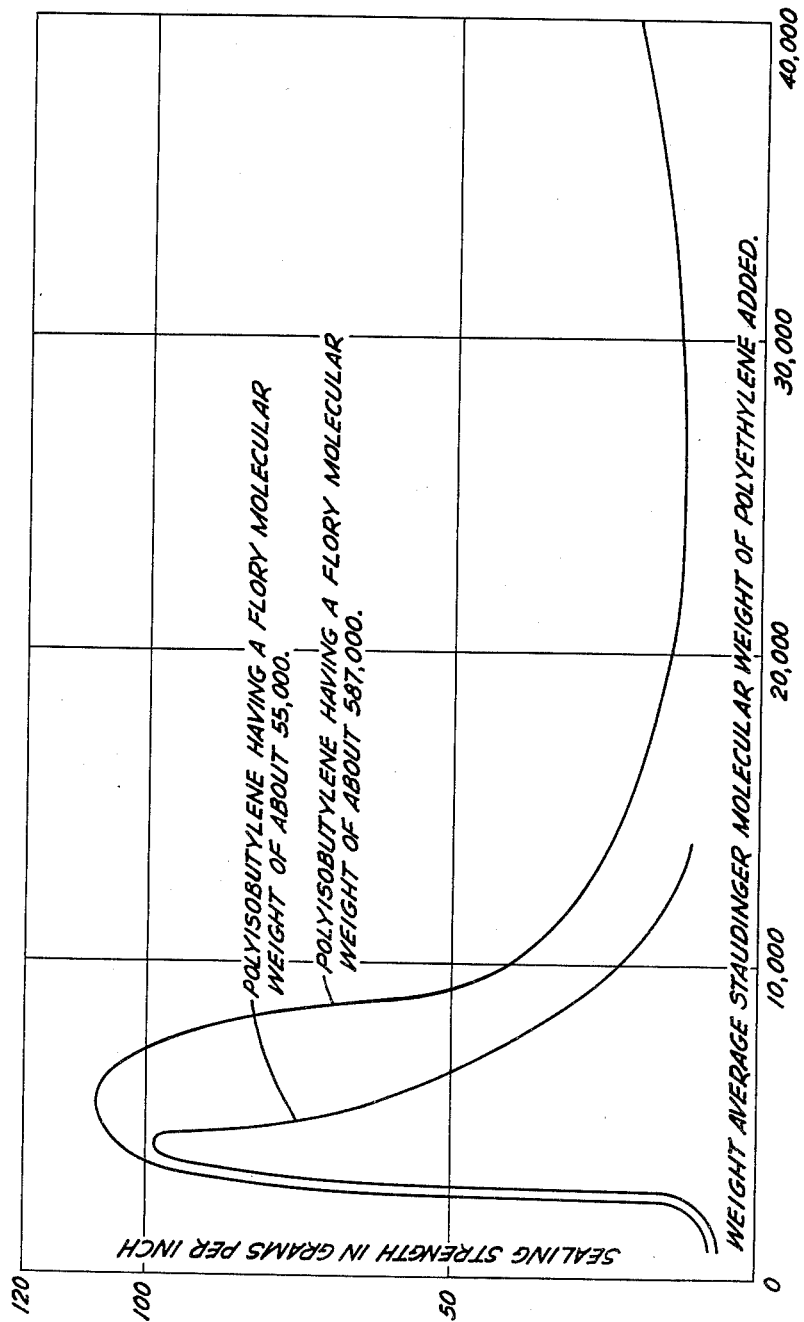

3,046,238
PARAFFIN WAX COMPOSITION CONTAINING POLYISOBUTYLENE AND POLYETHYLENE
William P. Ridenour, Pittsburgh, Pa., assignor to Gulf Research & Development Company, Pittsburgh, Pa., a corporation of Delaware
Filed Mar. 6, 1958, Ser. No. 719,623
8 Claims. (Cl. 260—28.5)

This invention relates to an improved wax composition, and more particularly to a paraffin wax composition having superior heat-sealing properties.

The employment of paraffin waxes has undergone a rapid growth in recent years. Thus, large quantities of paraffin wax compositions have found their way into the impregnation and coating of fibrous materials such as paper, fiber board, laminated papers, etc. These materials have also found wide use in the waterproofing of various textiles and papers, and in the formation of protective coatings for various materials.

Among many uses, wax compositions have been used as a bonding agent in the adhesive bonding technologies such as the wrapping paper industry, and the coated and laminated paper industry. Examples of these uses may be found in the waxed paper wrappings for food packages and the like such as bread, frozen foods, breakfast foods, paperboard cartons and drums, paper milk containers, bottle cap liner coatings, drinking cups, etc., and the various laminated paper compositions. When applied to these uses, one of the most valuable properties of the wax composition is its sealing strength. Thus, in the case of a wrapping paper, a poor seal requires a costly rewrapping of the package at the wrapping machine, and more seriously, may result in broken packages during subsequent handling. Moreover, the formation of a poor seal must be compensated for by expensive reinforcement techniques such as the use of excessive amounts of paper for a seal overlap, and the use of end labels or tabs for reinforcement. The use of these reinforcement techniques has proved costly in terms of time, material, unit production, customer good will, etc. In the case of laminates, a wax of low sealing strength may effectuate peeling and separation of the laminated layers.

Accordingly, it has become highly essential that wax compositions having high sealing strengths be developed. Since a large percentage of these self-sealing wax compositions are employed in the food industry, it is absolutely necessary that they be non-toxic. In many cases the deep penetration of the wax composition into the fiber structure of the material that is being impregnated is desirable, and it is therefore also essential that the viscosity of the mixture be sufficiently low so that rapid and deep penetration of the wax composition is ensured. However, with some materials wax compositions having high viscosities can advantageously be used.

Moreover, wax compositions possessing other properties, such as high tensile strength, have found wide uses in the packaging industry. Thus, a highly successful use has been found in the manufacture of certain types of paper milk containers, e.g., paper containers coated with paraffin wax or paraffin wax compositions. It is desirable that the wax employed for coating these paper containers possess a high tensile strength.

My invention comprises an improved paraffin wax composition which possesses a very high sealing strength, and also superior tensile strength, and other valuable properties. My improved paraffin wax composition comprises paraffin wax, rubbery isobutylene polymer and polyethylene. It is essential and critical for the purpose of my invention that the polyethylene have a weight average Staudinger molecular weight of between about 2500 and 14,000, particularly between about 3000 and 12,000, but most preferably between about 3000 and 8000. It is also essential and critical for the purpose of my invention that the rubbery isobutylene polymer have a Flory molecular weight of at least about 750.

By Staudinger molecular weights I mean those weight average molecular weights obtained by the method for determining the molecular weights of polymers devised by H. Staudinger (see a description of this method in an article by A. R. Kemp and H. Peters in Industrial and Engineering Chemistry, volume 35, pages 1108–1112, 1943). Briefly, this method is based upon a measurement of the relative viscosity of a solution of the polymer in a solvent such as tetrahydronaphthalene at a fixed temperature such as 130° C. Thus, to determine the weight average Staudinger molecular weight using tetrahydronaphthalene as the solvent, polyethylene in the form of 20 mesh powder is dissolved in tetrahydronaphthalene in an amount sufficient to obtain a concentration of 4.0 grams of polyethylene per liter of solution at 130° C. The relative viscosity ($N_r$) of this solution is determined at 130° C. From this relative viscosity determination, the weight average Staudinger molecular weight may be calculated using the equation:

$$M = \frac{K_{cm} \log_{10} N_r}{C}$$

where:

M=weight average Staudinger molecular weight
C=base molar concentration of polyethylene in tetrahydronaphthalene at the temperature of determination=

$$\frac{4.0 \text{ grams per liter of solution at } 130° \text{ C.}}{14}$$

$K_{cm}=4.03 \times 10^4$

While the weight average molecular weights secured by this method may be reproduced with a relatively high degree of accuracy, it is currently believed that the absolute molecular weight values obtained by this method are in error, and accordingly the Staudinger molecular weight values given throughout this application are not to be regarded as true absolute molecular weight values, but only as the weight average molecular weight values secured by the Staudinger method described above.

My invention is broadly applicable to paraffin waxes in general. By "paraffin wax" I mean the hard, crystalline hydrocarbon waxes such as are derived from mineral oils of the mixed base or paraffinic base type, or from shale oils, or the Fischer-Tropsch synthesis of hydrocarbons. The melting point of paraffin waxes contemplated ranges between about 90° to about 160° F., with the majority of commercial waxes having a melting point of between about 120° and 150° F.

By "polyethylene" is meant the semi-solid to solid polymers of ethylene. These have been produced over a wide range of weight average Staudinger molecular weights, such as of the order of 1000 to 100,000 or more. The polyethylenes are presently commercially available from the Bakelite Corporation, and also from E. I. du Pont de Nemours and Co., Inc., the latter marketing them under the trade name of "Alathon."

By "rubbery isobutylene polymer" is meant the polymerized isobutylenes such as polyisobutylene and the isobutylene copolymer rubbers containing at least 95 percent by weight of the hydrocarbon polymer as isobutylene constituent. The polyisobutylenes are marketed under the trade name "Vistanex" by the Enjay Company, Inc. The polyisobutylenes must have Flory molecular weights greater than about 750. Those having Flory molecular weights ranging from about 30,000 to molecular weights greatly in excess of a million are especially important with polyisobutylenes having Flory molecular weights of between about 55,000 and 1,325,000 being preferred. As indicated above, the isobutylene copolymer rubbers comprise high molecular weight polymers containing at least 95 percent by weight of the hydrocarbon polymer as isobutylene constituent. The remainder may comprise an olefinic-type compound such as butene, or a compound having a conjugated system of multiple bonds in which at least one of the multiple bonds is an ethylenic double bond. Examples of the last-mentioned type compound include styrene, acrylonitrile, methacrylonitrile, methacrylic acid, esters of methacrylic acid, butadiene, isoprene and chlorobutadiene. In addition, antioxidants and other polymer-additives can also be present with the copolymer. The preferred isobutylene copolymer rubbers contain a weight percentage of hydrocarbon polymer of between about 97 to 98 percent of isobutylene constituent and of between about 2 to 3 percent of isoprene constituent.

By "Flory molecular weight" I mean the viscosity average molecular weight obtained by the method for determining the molecular weights of polymers devised by Paul J. Flory and Thomas G. Fox, Jr., set forth in the Journal of Polymer Science, volume 5, pages 745–747 (1950). Briefly, this method is based upon a determination of the intrinsic viscosity ($N_i$) of a solution of the polymer in a solvent, such as benzene, at a fixed temperature, such as 24° C. The Flory molecular weight (M), constituting a viscosity average molecular weight, is then determined from the following formula:

$$M^{1/2} = N_i / K$$

where K is a constant, which is $1.07 \times 10^{-3}$ for polyisobutylene at 24° C. The intrinsic viscosity ($N_i$) is the limiting value of the ratio of the specific viscosity ($N_{sp}$) to the concentration of polymer at infinite dilution. The intrinsic viscosity ($N_i$) is determined by plotting the ratio of the specific viscosity ($N_{sp}$) to the concentration of polymer against the concentration of the polymer and extrapolating the resultant plot to zero concentration. The specific viscosity ($N_{sp}$) is equal to the relative viscosity ($N_r$) minus one, i.e., $N_{sp} = N_r - 1$, the relative viscosity ($N_r$) being the ratio of the viscosity of the solution of the polymer to the viscosity of the solvent.

Accordingly, to effect a Flory molecular weight determination, the relative viscosity ($N_r$) is determined for several different concentrations of the polymer in the solvent. From these several relative viscosities ($N_r$), the corresponding specific viscosities ($N_{sp}$) are calculated, as well as the ratios of the calculated specific viscosities ($N_{sp}$) to the corresponding concentrations. The ratios thus obtained are plotted against the corresponding concentrations and the straight line plot is extrapolated to zero concentration, thereby providing the intrinsic viscosity ($N_i$).

The Flory molecular weights were determined for a number of Vistanex polyisobutylene samples obtained from Enjay Company, Inc., at 24° C. employing benzene as the solvent. These Flory molecular weights are as follows:

| Vistanex designation: | Flory molecular weight |
|---|---|
| LM–MS | 55,000 |
| LM–H | 84,000 |
| B–60 | 587,000 |
| B–80 | 602,000 |
| B–100 | 980,000 |
| B–120 | 1,115,000 |
| B–140 | 1,323,000 |

As stated above, when paraffin wax is combined with rubbery isobutylene polymer having a Flory molecular weight of at least about 750 and a polyethylene having a weight average Staudinger molecular weight of from about 2500 to about 14,000, particularly between about 3000 and 12,000, but most preferably between about 3000 and 8000, a marked increase in the sealing strength of the resulting wax composition will be effected. I have found the resultant sealing strength of the combined mixture to be greater than the sealing strength of the pure paraffin wax, or a mixture of the paraffin wax with an equivalent amount of but one of the resins, or a mixture of the paraffin wax with an equivalent amount of both of the resins wherein the rubbery isobutylene polymer has a Flory molecular weight below about 750 and the polyethylene has a weight average Staudinger molecular weight outside the limits defined above.

A large number of compositions containing paraffin wax and rubbery isobutylene polymers combined with polyethylene of varying weight average Staudinger molecular weights have been prepared. These compositions were prepared by blending the rubbery isobutylene polymer and polyethylene into the molten paraffin wax with the use of an Eppenbach Homomixer. The blending temperature was kept below about 110° C., although in some cases the heat generated by stirring increased the blending temperature to as high as 130° C. After the mixture had been stirred until it was homogeneous, it was cooled and solidified.

The paraffin wax employed in the following examples was a refined paraffin wax having the following typical characteristics:

| | |
|---|---|
| Melting point | 123.4° F. |
| Viscosity (in Saybolt Universal seconds) | 49 at 130° F., 37 at 210° F. |
| Flash point (open cup) | 390° F. |
| Fire point | 440° F. |

After the samples had been prepared, they were tested for waxed paper sealing strength in the following manner: A 25 pound sulfite bread wrapper paper was treated with the wax composition so as to have a deposition of about twelve to thirteen pounds of wax composition per ream of 480, 24 inch by 36 inch sheets. In cases wherein the combined weight of the two resins, polyethylene and polyisobutylene, was in excess of about 7½ percent by weight of the total composition, the deposition of wax was about eighteen to nineteen pounds of wax composition per ream of 480, 24 inch by 36 inch sheets. The waxed paper was cut into strips 3 inches by 9 inches with the length being parallel to the paper fiber. After the waxed paper strips had been held at a constant temperature of 70° F. for at least 12 hours, they were sealed along the 3 inch width by means of a brass roll heated to a temperature of between 190° and 200° F., and then aged for 24 hours at 70° F. The sealing strength of the seal was then obtained by first trimming the seal to a width of 2 inches and a length of 4 inches, and then determining the amount of tension required to peel the sealed strips apart at a standard rate of pull of 5 millimeters per second. The sealing strength values are reported as grams per linear inch of width.

In the following table the sealing strength for a number of waxed papers that have been treated with paraffin wax compositions is presented as grams per linear inch. In all of the following examples, the weight ratio of polyethylene to rubbery isobutylene polymer comprising polyisobutylene was about 1:1 and the total weight percent of the combined polyethylene and rubbery isobutylene polymer was 5 percent. As stated above, each waxed paper contained a deposition of paraffin wax composition of approximately 12½ pounds per ream, except as noted in the preceding paragraph.

TABLE I

*Sealing Strengths of Paraffin Wax, and Paraffin Wax-Polyisobutylene-Polyethylene Compositions*

| Flory molecular weight of polyisobutylene constituents | Wax | Weight average Staudinger molecular weight of polyethylene constituent ||||||||||
|---|---|---|---|---|---|---|---|---|---|---|---|
| | | 1,000 | 2,200 | 4,000 | 7,000 | 10,000 | 14,000 | 20,000 | 28,000 | 33,000 | 38,000 |
| Wax | 6.5 | 7.9 | 10.9 | 15.6 | 11.5 | 13.0 | 9.4 | 11.0 | 10.8 | 14.1 | 30.8 |
| 55,000 (Vistanex LM-MS) | 8.7 | 6.8 | 7.7 | 99.0 | 46.0 | 22.0 | 9.6 | | | | |
| 84,000 (Vistanex LM-H) | 12.6 | | | 95.0 | 66.0 | 53.0 | | 13.0 | | | |
| 587,000 (Vistanex B-60) | 13.1 | 7.6 | 8.7 | 97.0 | 108.0 | 41.0 | 24.0 | 13.8 | 11.6 | 16.4 | 18.6 |
| 602,000 (Vistanex B-80) | 12.7 | | | 107.0 | 67.7 | 28.0 | 18.5 | 13.5 | | | |
| 980,000 (Vistanex B-100) | 14.3 | | 10.1 | 102.0 | 92.6 | 16.0 | 18.5 | | | | |
| 1,115,000 (Vistanex B-120) | 19.3 | | | 106.0 | 106.0 | 12.0 | | | | | |
| 1,323,000 (Vistanex B-140) | 12.0 | | | 90.0 | | | | | | | |

As can be seen from the foregoing, there is a striking increase in the sealing strength of the paraffin wax, polyisobutylene and polyethylene compositions when the polyethylene has a weight average Staudinger molecular weight of between about 2500 and about 14,000, with the most striking results shown with those polyethylene resins having weight average Staudinger molecular weights of about 4000 and about 7000.

Data similar to the foregoing have been used to prepare the curves shown in the accompanying figure, which is hereby incorporated into my specification and made a part thereof. Thus, the weight average Staudinger molecular weights of polyethylene were plotted against the sealing strengths of compositions containing a grade of polyisobutylene having a Flory molecular weight of about 55,000 and one of about 587,000. An examination of this curve reveals the striking positive effect on the sealing strength of the compositions containing polyethylene resins having a weight average Staudinger molecular weight of between about 2500 and about 14,000, and particularly between about 3000 and 12,000, but most preferably between about 3000 and 8000.

The criticality of the molecular weights of the resins employed in preparing the compositions of this invention is further illustrated in the following tables. The paraffin wax employed in each instance was similar to that used above and the compositions were prepared and tested in the same manner. In each of Tables 2 to 13, inclusive, the polyisobutylene employed had a Flory molecular weight of 587,000.

TABLE 2

| Paraffin wax, percent by weight | Polyethylene || Polyisobutylene, percent by weight | Sealing strength, grams per linear inch |
|---|---|---|---|---|
| | Percent by weight | Molecular weight | | |
| 99.9 | 0.1 | 1,000 | | 9.7 |
| 99.5 | 0.5 | 1,000 | | 8.0 |
| 99.0 | 1.0 | 1,000 | | 7.9 |
| 98.0 | 2.0 | 1,000 | | 7.2 |
| 97.0 | 3.0 | 1,000 | | 7.8 |
| 96.0 | 4.0 | 1,000 | | 8.2 |
| 95.0 | 5.0 | 1,000 | | 7.9 |
| 95.0 | | | 5.0 | 13.1 |
| 95.0 | 2.5 | 1,000 | 2.5 | 7.6 |

The data in Table 2 clearly show that the sealing strength of the three-component mixture is not improved in cases wherein the polyethylene has a weight average Staudinger molecular weight below 2500, namely 1000. In fact the sealing strength is less than when an equivalent amount of polyethylene alone having a weight average Staudinger molecular weight of 1000 is employed and far less than when an equivalent amount of polyisobutylene alone is used.

TABLE 3

| Paraffin wax, percent by weight | Polyethylene || Polyisobutylene, percent by weight | Sealing strength, grams per linear inch |
|---|---|---|---|---|
| | Percent by weight | Molecular weight | | |
| 95.0 | 5.0 | 2,000 | | 10.9 |
| 95.0 | | | 5.0 | 13.1 |
| 95.0 | 2.5 | 2,000 | 2.5 | 8.7 |

It is apparent from the data in Table 3 that the sealing strength of the three-component mixture is not significantly improved when the polyethylene having a weight average Staudinger molecular weight of 1000 is replaced with one having a weight average Staudinger molecular weight of 2000.

TABLE 4

| Paraffin wax, percent by weight | Polyethylene || Polyisobutylene, percent by weight | Sealing strength, grams per linear inch |
|---|---|---|---|---|
| | Percent by weight | Molecular weight | | |
| 97.5 | 2.5 | 4,000 | | 11.0 |
| 95.0 | 5.0 | 4,000 | | 15.6 |
| 95.0 | | | 5.0 | 13.1 |
| 95.0 | 2.5 | 4,000 | 2.5 | ¹ 88.5 |
| 95.0 | 4.0 | 4,000 | 1.0 | 54.0 |
| 95.0 | 1.0 | 4,000 | 4.0 | 80.0 |

¹ Average of two runs.

The astounding improvement obtained with paraffin wax compositions of my invention is apparent from Table 4. While the sealing strength was but 15.6 grams per linear inch when 5 percent of polyethylene having a Staudinger molecular weight of 4000 was employed and 13.1 grams per linear inch with 5 percent of polyisobutylene having a Flory molecular weight of 587,000, the sealing strength was increased to at least 54.0 grams per linear inch when an equivalent weight of both resins was employed. Note that the best result, 88.5 grams per linear inch, was reached when equal amounts of both resins were used.

TABLE 5

| Paraffin wax, percent by weight | Polyethylene || Polyisobutylene, percent by weight | Sealing strength, grams per linear inch |
|---|---|---|---|---|
| | Percent by weight | Molecular weight | | |
| 97.5 | 2.5 | 4,000 | | 11.0 |
| 95.0 | 5.0 | 4,000 | | 15.6 |
| 95.0 | | | 5.0 | 13.1 |
| 97.0 | 0.6 | 4,000 | 2.4 | 21.0 |
| 97.0 | 2.4 | 4,000 | 0.6 | 32.0 |
| 97.0 | 1.5 | 4,000 | 1.5 | 45.0 |

From the data set forth in Table 5 it is apparent that even lesser amounts of the two resins when combined with paraffin wax produces a composition having a higher sealing strength than paraffin with larger amounts of but one of the resins. Note again that the highest sealing strength was obtained in the case wherein the desired resins were employed in a 1:1 ratio.

TABLE 6

| Paraffin wax, percent by weight | Polyethylene | | Polyisobutylene, percent by weight | Sealing strength, grams per linear inch |
|---|---|---|---|---|
| | Percent by weight | Molecular weight | | |
| 97.5 | 2.5 | 7,000 | ----- | 13.0 |
| 95.0 | 5.0 | 7,000 | ----- | 11.5 |
| 95.0 | ----- | ------- | 5.0 | 13.1 |
| 95.0 | 2.5 | 7,000 | 2.5 | 108.0 |

The above table further shows that polyethylene within the desired molecular weight range, in this case having a weight average Staudinger molecular weight of 7000, will produce an extraordinarily high sealing strength when combined with the desired polyisobutylene.

TABLE 7

| Paraffin wax, percent by weight | Polyethylene | | Polyisobutylene, percent by weight | Sealing strength, grams per linear inch |
|---|---|---|---|---|
| | Percent by weight | Molecular weight | | |
| 97.5 | 2.5 | 10,000 | ----- | 13.0 |
| 95.0 | 5.0 | 10,000 | ----- | 13.0 |
| 95.0 | ----- | ------- | 5.0 | 13.1 |
| 95.0 | 2.5 | 10,000 | 2.5 | 22.0 |

The data in Table 7 further illustrate the fact that polyethylene within the desired molecular weight range will produce a paraffin wax composition having a high sealing strength. While the desired composition had a sealing strength lower than that obtained with compositions incorporating polyethylenes having Staudinger molecular weights of 4000 and 7000, nevertheless the sealing strength obtained is far superior to compositions incorporating an equivalent amount of each of the desired resins alone.

TABLE 8

| Paraffin wax, percent by weight | Polyethylene | | Polyisobutylene, percent by weight | Sealing strength, grams per linear inch |
|---|---|---|---|---|
| | Percent by weight | Molecular weight | | |
| 97.5 | 2.5 | 12,000 | ----- | 8.0 |
| 95.0 | 5.0 | 12,000 | ----- | 12.0 |
| 95.0 | ----- | ------- | 5.0 | 13.1 |
| 95.0 | 2.5 | 12,000 | 2.5 | 28.0 |

The results obtained using polyethylene having a weight Staudinger molecular weight of 12,000 in combination with the polyisobutylene are comparable to the results obtained with the composition in Table 7 wherein the polyethylene used had a Staudinger molecular weight of 10,000, and in fact are slightly superior thereto, 28.0 grams per linear inch against 22.0 grams per linear inch.

TABLE 9

| Paraffin wax, percent by weight | Polyethylene | | Polyisobutylene, percent by weight | Sealing strength, grams per linear inch |
|---|---|---|---|---|
| | Percent by weight | Molecular weight | | |
| 99.9 | 0.1 | 14,000 | ----- | 8.7 |
| 99.5 | 0.5 | 14,000 | ----- | 8.0 |
| 98.0 | 2.0 | 14,000 | ----- | 6.8 |
| 97.5 | 2.5 | 14,000 | ----- | 11.0 |
| 97.0 | 3.0 | 14,000 | ----- | 7.7 |
| 96.0 | 4.0 | 14,000 | ----- | 8.5 |
| 95.0 | 5.0 | 14,000 | ----- | 9.4 |
| 92.5 | 7.5 | 14,000 | ----- | 13.8 |
| 90.0 | 10.0 | 14,000 | ----- | 17.2 |
| 85.0 | 15.0 | 14,000 | ----- | 18.8 |
| 95.0 | ----- | ------- | 5.0 | 13.1 |
| 95.0 | 2.5 | 14,000 | 2.5 | 24.0 |

The data in Table 9 show that the desired and greatly increased sealing strength will still be obtained even though the Staudinger molecular weight of the polyethylene in the three-component mixture has been increased to 14,000. Note that 5 percent by weight of combined resins gives a sealing strength higher than that obtained with as high as 15 percent by weight of polyethylene having a weight average Staudinger molecular weight of 14,000.

TABLE 10

| Paraffin wax, percent by weight | Polyethylene | | Polyisobutylene, percent by weight | Sealing strength, grams per linear inch |
|---|---|---|---|---|
| | Percent by weight | Molecular weight | | |
| 98.0 | 2.0 | 20,000 | ----- | 8.3 |
| 97.5 | 2.5 | 20,000 | ----- | 9.0 |
| 95.0 | 5.0 | 20,000 | ----- | 11.0 |
| 95.0 | ----- | ------- | 5.0 | 13.1 |
| 95.0 | 2.5 | 20,000 | 2.5 | 13.8 |

From the data in Table 10 it will be seen that no appreciable or significant improvement is obtained by using in the three-component mixture a polyethylene having a weight average Staudinger molecular weight of 20,000.

TABLE 11

| Paraffin wax, percent by weight | Polyethylene | | Polyisobutylene, percent by weight | Sealing strength, grams per linear inch |
|---|---|---|---|---|
| | Percent by weight | Molecular weight | | |
| 98.0 | 2.0 | 28,000 | ----- | 8.8 |
| 95.0 | 5.0 | 28,000 | ----- | 10.8 |
| 95.0 | ----- | ------- | 5.0 | 13.1 |
| 95.0 | 2.5 | 28,000 | 2.5 | 11.6 |

The above Table 11 further shows that polyethylene outside the desired molecular weight range, in this case having a weight average Staudinger molecular weight of 28,000, does not contribute to increased sealing strength in the three-component mixture. In fact the combined mixture has a sealing strength lower than the composition containing an equivalent amount of polyisobutylene.

TABLE 12

| Paraffin wax, percent by weight | Polyethylene | | Polyisobutylene, percent by weight | Sealing strength, grams per linear inch |
|---|---|---|---|---|
| | Percent by weight | Molecular weight | | |
| 98.0 | 2.0 | 33,000 | ----- | 9.1 |
| 95.0 | 5.0 | 33,000 | ----- | 14.1 |
| 95.0 | ----- | ------- | 5.0 | 13.1 |
| 95.0 | 2.5 | 33,000 | 2.5 | 16.4 |

TABLE 13

| Paraffin wax, percent by weight | Polyethylene Percent by weight | Polyethylene Molecular weight | Polyisobutylene, percent by weight | Sealing strength, grams per linear inch |
|---|---|---|---|---|
| 98.0 | 2.0 | 38,000 | ----- | 11.7 |
| 95.0 | 5.0 | 38,000 | ----- | 30.8 |
| 95.0 | ----- | ------- | 5.0 | 13.1 |
| 95.0 | 2.5 | 38,000 | 2.5 | 18.6 |
| 95.0 | 1.0 | 38,000 | 4.0 | 15.4 |

The data in Tables 12 and 13 further show that polyethylenes having a molecular weight beyond the desired limits defined herein do not produce the beneficial and superior sealing strength contemplated by the present invention. While the data in Table 12 show that the sealing strength of the combined mixture using polyethylene having a weight average Staudinger molecular weight of 33,000 is slightly better than the paraffin wax with but one of the resins, the improvement is so slight as to be almost negligible.

Tables 14 to 18, inclusive, below, further illustrate the benefits of my invention. The main difference between Tables 14 to 18 and those immediately above is that in place of a polyisobutylene having a Flory molecular weight of 587,000, a polyisobutylene having a Flory molecular weight of 602,000 was used.

TABLE 14

| Paraffin wax, percent by weight | Polyethylene Percent by weight | Polyethylene Molecular weight | Polyisobutylene, percent by weight | Sealing strength, grams per linear inch |
|---|---|---|---|---|
| 97.5 | 2.5 | 4,000 | ----- | 11.0 |
| 95.0 | 5.0 | 4,000 | ----- | 15.6 |
| 95.0 | ----- | ------- | 5.0 | 12.7 |
| 95.0 | 2.5 | 4,000 | 2.5 | 107.0 |

TABLE 15

| Paraffin wax, percent by weight | Polyethylene Percent by weight | Polyethylene Molecular weight | Polyisobutylene, percent by weight | Sealing strength, grams per linear inch |
|---|---|---|---|---|
| 97.5 | 2.5 | 7,000 | ----- | 13.0 |
| 95.0 | 5.0 | 7,000 | ----- | 11.5 |
| 95.0 | ----- | ------- | 5.0 | 12.7 |
| 95.0 | 2.5 | 7,000 | 2.5 | 67.7 |

TABLE 16

| Paraffin wax, percent by weight | Polyethylene Percent by weight | Polyethylene Molecular weight | Polyisobutylene, percent by weight | Sealing strength, grams per linear inch |
|---|---|---|---|---|
| 97.5 | 2.5 | 10,000 | ----- | 13.0 |
| 95.0 | 5.0 | 10,000 | ----- | 13.0 |
| 95.0 | ----- | ------- | 5.0 | 12.7 |
| 95.0 | 2.5 | 10,000 | 2.5 | 28.0 |

TABLE 17

| Paraffin wax, percent by weight | Polyethylene Percent by weight | Polyethylene Molecular weight | Polyisobutylene, percent by weight | Sealing strength, grams per linear inch |
|---|---|---|---|---|
| 99.9 | 0.1 | 14,000 | ----- | 8.7 |
| 99.5 | 0.5 | 14,000 | ----- | 8.0 |
| 98.0 | 2.0 | 14,000 | ----- | 6.8 |
| 97.5 | 2.5 | 14,000 | ----- | 11.0 |
| 97.0 | 3.0 | 14,000 | ----- | 7.7 |
| 96.0 | 4.0 | 14,000 | ----- | 8.5 |
| 95.0 | 5.0 | 14,000 | ----- | 9.4 |
| 92.5 | 7.5 | 14,000 | ----- | 13.8 |
| 90.0 | 10.0 | 14,000 | ----- | 17.2 |
| 85.0 | 15.0 | 14,000 | ----- | 18.8 |
| 95.0 | ----- | ------- | 5.0 | 12.7 |
| 95.0 | 2.5 | 14,000 | 2.5 | 18.5 |

TABLE 18

| Paraffin wax, percent by weight | Polyethylene Percent by weight | Polyethylene Molecular weight | Polyisobutylene, percent by weight | Sealing strength, grams per linear inch |
|---|---|---|---|---|
| 98.0 | 2.0 | 20,000 | ----- | 8.3 |
| 97.5 | 2.5 | 20,000 | ----- | 9.0 |
| 95.0 | 5.0 | 20,000 | ----- | 11.0 |
| 95.0 | ----- | ------- | 5.0 | 12.7 |
| 95.0 | 2.5 | 20,000 | 2.5 | 13.5 |

It will be seen from the data in Tables 14 to 18 that the three-component mixtures employing polyethylenes having a weight average Staudinger molecular weight of 4000 and 7000 have sealing strengths far greater than the paraffin wax compositions containing either the polyethylenes or the polyisobutylenes alone. Although the sealing strength of the three-component mixture declines somewhat with the use of polyethylene having a weight average Staudinger molecular weight of 10,000, nevertheless the sealing strength obtained, 28.0 grams per linear inch, is far in excess of the composition containing an equivalent amount of either the polyethylene or polyisobutylene alone. In Table 17, it will be noted the sealing strength of the combined mixture, 18.5 grams per linear inch, is still greater than a paraffin wax containing 5 percent of the same polyethylene or 5 percent of polyisobutylene. Note that the sealing strength of the combined, three-component mixture is about equal to the sealing strength of one containing three times the equivalent amount of the same polyethylene. The sealing strength of the three-component mixture containing polyethylene having a weight average Staudinger molecular weight of 20,000 is not significantly different than the mixture obtained with an equivalent amount of the same polyethylene or polyisobutylene.

In Tables 19 to 26, inclusive, following, there is a tabulation of additional data illustrating the advantages of my invention. The only difference between the compositions referred to in Tables 19 to 26 and the tables preceding is that polyisobutylenes having Flory molecular weights of from 55,000 to 84,000 were used in Tables 19 to 26.

TABLE 19

| Paraffin wax, percent by weight | Polyethylene Percent by weight | Polyethylene Molecular weight | Polyisobutylene, percent by weight | Sealing strength, grams per linear inch |
|---|---|---|---|---|
| 99.9 | 0.1 | 1,000 | ----- | 9.7 |
| 99.5 | 0.5 | 1,000 | ----- | 8.0 |
| 99.0 | 1.0 | 1,000 | ----- | 7.9 |
| 98.0 | 2.0 | 1,000 | ----- | 7.2 |
| 97.0 | 3.0 | 1,000 | ----- | 7.8 |
| 96.0 | 4.0 | 1,000 | ----- | 8.2 |
| 95.0 | 5.0 | 1,000 | ----- | 7.9 |
| 98.0 | ----- | ------- | 2.0 | 8.6 |
| 97.5 | ----- | ------- | 2.5 | [1] 7.7 |
| 95.0 | ----- | ------- | 5.0 | [2] 10.7 |
| 92.5 | ----- | ------- | 7.5 | 11.5 |
| 85.0 | ----- | ------- | 15.0 | 17.5 |
| 80.0 | ----- | ------- | 20.0 | [2] 20.1 |
| 95.0 | 1.0 | 1,000 | 4.0 | 7.5 |
| 95.0 | 2.5 | 1,000 | 2.5 | 6.8 |

[1] Average of three runs.
[2] Average of two runs.

TABLE 20

| Paraffin wax, percent by weight | Polyethylene Percent by weight | Polyethylene Molecular weight | Polyisobutylene, percent by weight | Sealing strength, grams per linear inch |
|---|---|---|---|---|
| 95.0 | 5.0 | 2,000 | ----- | 10.9 |
| 98.0 | ----- | ------- | 2.0 | 8.6 |
| 97.5 | ----- | ------- | 2.5 | [1] 7.7 |
| 95.0 | ----- | ------- | 5.0 | [2] 10.7 |
| 92.5 | ----- | ------- | 7.5 | 11.5 |
| 85.0 | ----- | ------- | 15.0 | 17.5 |
| 80.0 | ----- | ------- | 20.0 | [2] 20.1 |
| 95.0 | 2.5 | 2,000 | 2.5 | 7.7 |

[1] Average of three runs.
[2] Average of two runs.

TABLE 21

| Paraffin wax, percent by weight | Polyethylene Percent by weight | Polyethylene Molecular weight | Polyisobutylene, percent by weight | Sealing strength, grams per linear inch |
|---|---|---|---|---|
| 97.5 | 2.5 | 4,000 | ----- | 11.0 |
| 95.0 | 5.0 | 4,000 | ----- | 15.6 |
| 98.0 | ----- | ------- | 2.0 | 8.6 |
| 97.5 | ----- | ------- | 2.5 | [1] 7.7 |
| 95.0 | ----- | ------- | 5.0 | [2] 10.7 |
| 92.5 | ----- | ------- | 7.5 | 11.5 |
| 85.0 | ----- | ------- | 15.0 | 17.5 |
| 80.0 | ----- | ------- | 20.0 | [2] 20.1 |
| 98.0 | 1.0 | 4,000 | 1.0 | 18.0 |
| 97.0 | 1.5 | 4,000 | 1.5 | 30.0 |
| 96.0 | 2.0 | 4,000 | 2.0 | [2] 48.0 |
| 95.0 | 1.0 | 4,000 | 4.0 | 36.3 |
| 95.0 | 2.5 | 4,000 | 2.5 | [3] 73.8 |
| 92.5 | 3.75 | 4,000 | 3.75 | 124.0 |
| 90.0 | 5.0 | 4,000 | 5.0 | 127.0 |

[1] Average of three runs.
[2] Average of two runs.
[3] Average of four runs.

TABLE 22

| Paraffin wax, percent by weight | Polyethylene Percent by weight | Polyethylene Molecular weight | Polyisobutylene, percent by weight | Sealing strength, grams per linear inch |
|---|---|---|---|---|
| 97.5 | 2.5 | 7,000 | ----- | 13.0 |
| 95.0 | 5.0 | 7,000 | ----- | 11.5 |
| 98.0 | ----- | ------- | 2.0 | 8.6 |
| 97.5 | ----- | ------- | 2.5 | [1] 7.7 |
| 95.0 | ----- | ------- | 5.0 | [2] 10.7 |
| 92.5 | ----- | ------- | 7.5 | 11.5 |
| 85.0 | ----- | ------- | 15.0 | 17.5 |
| 80.0 | ----- | ------- | 20.0 | [2] 20.1 |
| 95.0 | 2.5 | 7,000 | 2.5 | [1] 66.7 |
| 95.0 | 1.0 | 7,000 | 4.0 | 74.0 |

[1] Average of three runs.
[2] Average of two runs.

TABLE 23

| Paraffin wax, percent by weight | Polyethylene Percent by weight | Polyethylene Molecular weight | Polyisobutylene, percent by weight | Sealing strength, grams per linear inch |
|---|---|---|---|---|
| 97.5 | 2.5 | 10,000 | ----- | 13.0 |
| 95.0 | 5.0 | 10,000 | ----- | 13.0 |
| 98.0 | ----- | ------- | 2.0 | 8.6 |
| 97.5 | ----- | ------- | 2.5 | [1] 7.7 |
| 95.0 | ----- | ------- | 5.0 | [2] 10.7 |
| 92.5 | ----- | ------- | 7.5 | 11.5 |
| 85.0 | ----- | ------- | 15.0 | 17.5 |
| 80.0 | ----- | ------- | 20.0 | [2] 20.1 |
| 95.0 | 1.0 | 10,000 | 4.0 | 17.8 |
| 95.0 | 2.5 | 10,000 | 2.5 | [2] 37.5 |

[1] Average of three runs.
[2] Average of two runs.

TABLE 24

| Paraffin wax, percent by weight | Polyethylene Percent by weight | Polyethylene Molecular weight | Polyisobutylene, percent by weight | Sealing strength, grams per linear inch |
|---|---|---|---|---|
| 99.9 | 0.1 | 14,000 | ----- | 8.7 |
| 99.5 | 0.5 | 14,000 | ----- | 8.0 |
| 98.0 | 2.0 | 14,000 | ----- | 6.8 |
| 97.5 | 2.5 | 14,000 | ----- | 11.0 |
| 97.0 | 3.0 | 14,000 | ----- | 7.7 |
| 96.0 | 4.0 | 14,000 | ----- | 8.59 |
| 95.0 | 5.0 | 14,000 | ----- | 9.4 |
| 92.5 | 7.5 | 14,000 | ----- | 13.8 |
| 90.0 | 10.0 | 14,000 | ----- | 17.2 |
| 85.0 | 15.0 | 14,000 | ----- | 18.8 |
| 80.0 | 20.0 | 14,000 | ----- | 93.5 |
| 98.0 | ----- | ------- | 2.0 | 8.6 |
| 97.5 | ----- | ------- | 2.5 | [1] 7.7 |
| 95.0 | ----- | ------- | 5.0 | [2] 10.7 |
| 92.5 | ----- | ------- | 7.5 | 11.5 |
| 85.0 | ----- | ------- | 15.0 | 17.5 |
| 80.0 | ----- | ------- | 20.0 | [2] 20.1 |
| 99.0 | 0.5 | 14,000 | 0.5 | 7.8 |
| 98.0 | 1.0 | 14,000 | 1.0 | 9.0 |
| 96.7 | 1.667 | 14,000 | 1.667 | 9.5 |
| 96.0 | 3.0 | 14,000 | 1.0 | 8.0 |
| 96.0 | 2.0 | 14,000 | 2.0 | 8.7 |
| 95.5 | 4.0 | 14,000 | 0.5 | 8.5 |
| 95.0 | 1.0 | 14,000 | 4.0 | 17.0 |
| 95.0 | 4.0 | 14,000 | 1.0 | 8.4 |
| 95.0 | 3.0 | 14,000 | 2.0 | 10.3 |
| 92.5 | 3.75 | 14,000 | 3.75 | [2] 23.0 |
| 90.0 | 5.0 | 14,000 | 5.0 | 24.5 |
| 85.0 | 7.5 | 14,000 | 7.5 | 23.0 |
| 80.0 | 10.0 | 14,000 | 10.0 | [2] 102.8 |

[1] Average of three runs.
[2] Average of two runs.

TABLE 25

| Paraffin wax, percent by weight | Polyethylene Percent by weight | Polyethylene Molecular weight | Polyisobutylene, percent by weight | Sealing strength, grams per linear inch |
|---|---|---|---|---|
| 98.0 | 2.0 | 20,000 | ----- | 8.3 |
| 97.5 | 2.5 | 20,000 | ----- | 9.0 |
| 95.0 | 5.0 | 20,000 | ----- | 11.0 |
| 98.0 | ----- | ------- | 2.0 | 8.6 |
| 97.5 | ----- | ------- | 2.5 | [1] 7.7 |
| 95.0 | ----- | ------- | 5.0 | [2] 10.7 |
| 92.5 | ----- | ------- | 7.5 | 11.5 |
| 85.0 | ----- | ------- | 15.0 | 17.5 |
| 80.0 | ----- | ------- | 20.0 | [2] 20.1 |
| 98.0 | 1.0 | 20,000 | 1.0 | 9.9 |
| 95.0 | 1.0 | 20,000 | 4.0 | [2] 13.6 |
| 95.0 | 2.0 | 20,000 | 3.0 | 11.6 |
| 95.0 | 3.0 | 20,000 | 2.0 | 11.9 |
| 95.0 | 4.0 | 20,000 | 1.0 | 11.1 |
| 95.0 | 2.5 | 20,000 | 2.5 | 13.0 |

[1] Average of three runs.
[2] Average of two runs.

TABLE 26

| Paraffin wax, percent by weight | Polyethylene | | Polyiso-butylene, percent by weight | Sealing strength, grams per linear inch |
|---|---|---|---|---|
| | Percent by weight | Molecular weight | | |
| 98.0 | 2.0 | 38,000 | ----- | 11.7 |
| 95.0 | 5.0 | 38,000 | ----- | 30.8 |
| 98.0 | ----- | ----- | 2.0 | 8.6 |
| 97.5 | ----- | ----- | 2.5 | [1] 7.7 |
| 95.0 | ----- | ----- | 5.0 | [2] 10.7 |
| 92.5 | ----- | ----- | 7.5 | 11.5 |
| 85.0 | ----- | ----- | 15.0 | 17.5 |
| 80.0 | ----- | ----- | 20.0 | [2] 20.1 |
| 95.0 | 1.0 | 38,000 | 4.0 | 13.3 |

[1] Average of three runs.
[2] Average of two runs.

In the above it will again be seen that polyethylenes having a weight average Staudinger molecular weight below about 2500, specifically 1000 and 2000, as shown in Tables 19 and 20, respectively, do not produce improvements in sealing strength when present in the three-component mixture. The substantial improvement obtained using polyethylene having a weight average Staudinger molecular weight of 4000 can be seen in Table 21. Note further that the best results are obtained by using the resins in a 1:1 ratio: 2.5 percent of polyethylene and 2.5 percent of polyisobutylene in the three-component mixture resulted in a much higher sealing strength than in the case wherein one percent of the former and 4 percent of the latter were used. The three-component mixture in Table 22, using polyethylene having a weight average Staudinger molecular weight of 7000, as with the other three-component mixtures using the same resin, has an extremely high sealing strength. The three-component mixture of Table 23, wherein polyethylene having a weight average Staudinger molecular weight of 10,000 is employed, similarly has a high sealing strength. Note again that best results are obtained when the two resins are employed in a 1:1 ratio. An inspection of the data in Table 24 shows that while results obtained using a polyethylene having a weight average Staudinger molecular weight of 14,000 in the particular composition were somewhat lower than with the above, nevertheless, the three-component mixture, in general, has a higher sealing strength than the paraffin wax composition containing an equivalent amount of each of the resins. This is apparent by comparing with each other the compositions wherein a total of 2, 5, 7.5, 15 and 20 percent by weight of either of the resins or both were incorporated in the final composition. From Tables 25 and 26 it can be seen that polyethylenes having a weight average Staudinger weight of 20,000 and 38,000, respectively, offer no appreciable or significant improvement in the sealing strength of the three-component mixture.

Data relating to still other compositions showing the advantages of the present invention are set forth below in Tables 27 to 32, inclusive. The only difference between the compositions of Tables 27 to 32 and the compositions previously considered is that a polyisobutylene having a Flory molecular weight of 980,000 is employed in the compositions of Tables 27 to 32.

TABLE 27

| Paraffin wax, percent by weight | Polyethylene | | Polyiso-butylene, percent by weight | Sealing strength, grams per linear inch |
|---|---|---|---|---|
| | Percent by weight | Molecular weight | | |
| 95.0 | 5.0 | 2,000 | ----- | 10.9 |
| 95.0 | ----- | ----- | 5.0 | 14.3 |
| 95.0 | 2.5 | 2,000 | 2.5 | 10.1 |

TABLE 28

| Paraffin wax, percent by weight | Polyethylene | | Polyiso-butylene, percent by weight | Sealing strength, grams per linear inch |
|---|---|---|---|---|
| | Percent by weight | Molecular weight | | |
| 97.5 | 2.5 | 4,000 | ----- | 11.0 |
| 95.0 | 5.0 | 4,000 | ----- | 15.6 |
| 95.0 | ----- | ----- | 5.0 | 14.3 |
| 95.0 | 2.5 | 4,000 | 2.5 | 102.0 |

TABLE 29

| Paraffin wax, percent by weight | Polyethylene | | Polyiso-butylene, percent by weight | Sealing strength, grams per linear inch |
|---|---|---|---|---|
| | Percent by weight | Molecular weight | | |
| 97.5 | 2.5 | 7,000 | ----- | 13.0 |
| 95.0 | 5.0 | 7,000 | ----- | 11.5 |
| 95.0 | ----- | ----- | 5.0 | 14.3 |
| 95.0 | 2.5 | 7,000 | 2.5 | 92.0 |

TABLE 30

| Paraffin wax, percent by weight | Polyethylene | | Polyiso-butylene, percent by weight | Sealing strength, grams per linear inch |
|---|---|---|---|---|
| | Percent by weight | Molecular weight | | |
| 97.5 | 2.5 | 10,000 | ----- | 13.0 |
| 95.0 | 5.0 | 10,000 | ----- | 13.0 |
| 95.0 | ----- | ----- | 5.0 | 14.3 |
| 95.0 | 2.5 | 10,000 | 2.5 | 16.0 |

TABLE 31

| Paraffin wax, percent by weight | Polyethylene | | Polyiso-butylene, percent by weight | Sealing strength, grams per linear inch |
|---|---|---|---|---|
| | Percent by weight | Molecular weight | | |
| 99.9 | 0.1 | 14,000 | ----- | 8.7 |
| 99.5 | 0.5 | 14,000 | ----- | 8.0 |
| 98.0 | 2.0 | 14,000 | ----- | 6.8 |
| 97.5 | 2.5 | 14,000 | ----- | 11.0 |
| 97.0 | 3.0 | 14,000 | ----- | 7.7 |
| 96.0 | 4.0 | 14,000 | ----- | 8.5 |
| 95.0 | 5.0 | 14,000 | ----- | 9.4 |
| 92.5 | 7.5 | 14,000 | ----- | 13.8 |
| 90.0 | 10.0 | 14,000 | ----- | 17.2 |
| 85.0 | 15.0 | 14,000 | ----- | 18.8 |
| 95.0 | ----- | ----- | 5.0 | 14.3 |
| 95.0 | 2.5 | 14,000 | 2.5 | 18.5 |

TABLE 32

| Paraffin wax, percent by weight | Polyethylene | | Polyiso-butylene, percent by weight | Sealing strength, grams per linear inch |
|---|---|---|---|---|
| | Percent by weight | Molecular weight | | |
| 98.0 | 2.0 | 38,000 | ----- | 11.7 |
| 95.0 | 5.0 | 38,000 | ----- | 30.8 |
| 95.0 | ----- | ----- | 5.0 | 14.3 |
| 95.0 | 1.0 | 38,000 | 4.0 | 15.8 |

From the tables immediately above it can be seen that three-component compositions containing polyethylenes having a weight average Staudinger molecular weight below 2500 do not possess the desired improved sealing strength while those containing polyethylenes having weight average Staudinger molecular weights of 4000 and 7000 possess highly superior sealing strength. The three-component mixtures containing polyethylenes having Staudinger molecular weights of 10,000 and 14,000 possess a somewhat reduced sealing strength but still superior to compositions containing but one of the resins. As before, results obtained using polyethylene having a weight average Staudinger molecular weight of 38,000 were unsatisfactory.

Additional tests were run in which the isobutylene polymers above were replaced with an isobutylene copolymer rubber having about 98 percent by weight of the hydrocarbon polymer as isobutylene constituent, with the remaining two percent by weight of the hydrocarbon polymer as isoprene constituent and also containing an antioxidant [this copolymer rubber being designated a "GR–1–70" in Specifications for Government Synthetic Rubbers (Revised Edition) issued by the Reconstruction Finance Corportion, Office of Rubber Reserve].

TABLE 33

| Paraffin wax, percent by weight | Polyethylene | | Polyisobutylene, percent by weight | Sealing strength, grams per linear inch |
|---|---|---|---|---|
| | Percent by weight | Molecular weight | | |
| 95 | ----- | -------- | 5.0 | 16.5 |
| 95 | 5.0 | 1,000 | ----- | 7.9 |
| 95 | 2.5 | 1,000 | 2.5 | 8.2 |
| 95 | 5.0 | 4,000 | ----- | 19.3 |
| 95 | 2.5 | 4,000 | 2.5 | 68.3 |
| 90 | 5.0 | 4,000 | 5.0 | 145.0 |
| 95 | 5.0 | 7,000 | ----- | 11.5 |
| 95 | 2.5 | 7,000 | 2.5 | 77.0 |
| 95 | 5.0 | 20,000 | ----- | 11.0 |
| 95 | 2.5 | 20,000 | 2.5 | 15.0 |
| 95 | 5.0 | 28,000 | ----- | 11.0 |
| 95 | 2.5 | 28,000 | 2.5 | 18.0 |

The data in Table 33 show that the three-component mixture of my invention exhibits the same general advantages with isobutylene copolymers as with polyisobutylene. Note that the use of polyethylene having a weight average Staudinger molecular weight of 1000 does not improve the sealing strength of the three-component mixture, while the use of polyethylenes having a weight average Staudinger molecular weight of 4000 and 7000 results in spectacular increases in sealing strength. Insofar as results obtained using polyethylenes having weight average Staudinger molecular weights of 20,000 and 28,000 is concerned, it is seen that the three-component mixture has a somewhat higher sealing strength than the paraffin wax with the polyethylene alone. It is noted, however, that no test is presented showing the sealing strength of the paraffin wax with the isobutylene copolymer rubber alone. It is believed that if such test had been made, the sealing strength of the three-component mixture would not have been higher than sealing strength of the composition with the isobutylene copolymer rubber alone.

It has been stated earlier that the molecular weight of the rubbery isobutylene polymer employed is critical and must be at least about 750. This is shown below in Table 34. The polyethylene employed has a weight average Staudinger molecular weight of 4000.

TABLE 34

| Paraffin wax, percent by weight | Polyethylene, percent by weight | Polyisobutylene | | Sealing strength, grams per linear inch |
|---|---|---|---|---|
| | | Percent by weight | Molecular weight | |
| 95.0 | ----- | 5.0 | 330 | 3.0 |
| 95.0 | ----- | 5.0 | 420 | 3.0 |
| 95.0 | ----- | 5.0 | 470 | 5.0 |
| 95.0 | ----- | 5.0 | 660 | 6.0 |
| 97.5 | ----- | 2.5 | 700 | 5.0 |
| 95.0 | ----- | 5.0 | 700 | 7.0 |
| 97.5 | ----- | 2.5 | 730 | 6.0 |
| 95.0 | ----- | 5.0 | 780 | 8.0 |
| 97.5 | ----- | 2.5 | 940 | 11.0 |
| 95.0 | ----- | 5.0 | 940 | 11.0 |
| 97.5 | ----- | 2.5 | 1,200 | 11.0 |
| 95.0 | ----- | 5.0 | 1,200 | 10.0 |
| 97.5 | 2.5 | ----- | ----- | 11.0 |
| 95.0 | 5.0 | ----- | ----- | 15.6 |
| 95.0 | 2.5 | 2.5 | 330 | [1] 5 |
| 95.0 | 2.5 | 2.5 | 420 | [1] 4.5 |
| 95.0 | 2.5 | 2.5 | 470 | [1] 7.5 |
| 95.0 | 2.5 | 2.5 | 660 | [1] 11.5 |
| 95.0 | 2.5 | 2.5 | 700 | [1] 15.0 |
| 95.0 | 2.5 | 2.5 | 780 | [1] 20.5 |
| 95.0 | 2.5 | 2.5 | 940 | [1] 32.5 |
| 95.0 | 2.5 | 2.5 | 1,200 | 29.0 |

[1] Average of runs.

Note that the three-component mixture using polyisobutylene having a Flory molecular weight of 700 has a sealing strength just about equal to the composition containing paraffin wax and an equivalent weight of the polyethylene. However, just as soon as polyisobutylenes having Flory molecular weights in excess thereof are incorporated in the three-component mixtures, the sealing strength thereof is increased greatly and is in excess of paraffin wax compositions containing equivalent amounts of either of the two resins.

In addition to the foregoing, I have found a concomitant decrease in the viscosity of these compositions, as compared to the viscosities of compositions containing solely paraffin wax and polyisobutylene. Thus, for example, I have found that a 5 weight percent composition of a grade of polyisobutylene having a Flory molecular weight of about 587,000 had a viscosity at 210° F. of 642.7 Saybolt Universal seconds, whereas a 5 weight percent composition of equal parts by weight of this grade polyisobutylene and a grade of polyethylene having a weight average Staudinger molecular weight of about 4000 had a viscosity of but 130.6 Saybolt Universal seconds. Similar compositions containing grades of polyethylene having weight average Staudinger molecular weights of about 7000 and 14,000 in place of the aforementioned grade of polyethylene, had Saybolt Universal viscosities of but 167 and 252.5 seconds, respectively. Similarly, a 5 weight percent composition of a grade of polyisobutylene having a Flory molecular weight of about 980,000 had a Saybolt Universal viscosity at 210° F. of 1420.8 seconds whereas a 5 weight percent composition of equal parts by weight of this grade polyisobutylene and a grade of polyethylene having a weight average Staudinger molecular weight of about 7000 had a Saybolt Universal viscosity at 210° F. of but 255.8 seconds.

The above-noted decrease in viscosity is of great value in the impregnation of certain papers, inasmuch as it permits a more ready penetration into the fiber without application of drastic temperature conditions during treatment.

In addition to the improved sealing strength obtained by paraffin wax compositions of my invention, I have found that these compositions have markedly superior tensile strength properties. Thus, for example, a paraffin wax composition containing 2.5 weight percent of a grade of polyethylene having a weight average Staudinger molecular weight of about 7000 and 2.5 weight percent of a grade of polyisobutylene having a Flory molecular weight of about 587,000 had a tensile strength of 129.8 pounds per ¼ square inch at 70° F., which is striking when compared with the tensile strengths for pure paraffin wax; paraffin wax plus 5 weight percent of the aforementioned grade of polyethylene; and paraffin wax plus 5 weight percent of the aforementioned grade of polyisobutylene which were: 52.6, 108.4 and 87.2, respectively.

My improved compositions can advantageously be prepared with as low a weight percentage as about one weight percent of combined polyethylene plus rubbery isobutylene polymer, although amounts in excess thereof are preferred for best results. In general, no more than about 20 weight percent, preferably no more than about 10 weight percent, but most preferably no more than about 5 weight percent, of combined resins are used. While best results are generally obtained when the polyethylene and rubbery isobutylene polymer are employed in approximately equal parts by weight, the weight ratios can be about 10:1 to about 1:10, preferably about 4:1 to about 1:4.

In addition to paraffin wax, rubbery isobutylene polymer and polyethylene, it is often desirable to have an antioxidant present in the paraffin wax composition. Examples of suitable antioxidants include substances such as bis(2-hydroxy, 3-tertiary butyl, 5-methyl phenyl) methane, 2,6-ditertiary butyl para cresol, etc. In addition to the antioxidants, additional substances may also be present such as other waxes like microcrystalline wax; vegetable and insect waxes such as candelilla wax, Esparto wax, beeswax and Chinese insect wax; gums and resins such as ester gum, gum Dammar, rosin, and rubber; ozokerite; high molecular weight alcohols; carnauba wax; petrolatum; hydrogenated castor oil; and montan wax; etc.

It is obvious that my invention may be modified by one skilled in the art, and it is to be understood that these modifications which are readily apparent to one skilled in the art are included within my invention and made a part of the appended claims. By way of example, these modifications include preparing my improved compositions under different conditions of temperature than those which I have disclosed, and the substitution of other rubbery isobutylene polymer and polyethylene resins for those which I have described.

My invention produces superior paraffin wax compositions having improved sealing strengths, tensile strengths, and other properties. The compositions of my invention may advantageously be employed in such various uses as the manufacture of wrapping papers, laminates, waxed papers, paper cartons, reinforced fibrous materials, etc.

This application is a continuation-in-part of my United States application for Letters Patent, Serial No. 223,176, filed April 27, 1951, now abandoned and assigned to the same assignee as the instant application.

Obviously, many modifications and variations of the invention as hereinabove set forth can be made without departing from the spirit and scope thereof, and therefore only such limitations should be imposed as are indicated in the appended claims.

I claim:

1. An improved paraffin wax composition comprising essentially paraffin wax and a total of about one to about 20 percent by weight of a rubbery isobutylene polymer having a Flory molecular weight of at least about 750 and polyethylene having a weight average Staudinger molecular weight of about 3000 to about 12,000.

2. An improved paraffin wax composition comprising essentially paraffin wax and a total of about one to about 20 percent by weight of a rubbery isobutylene polymer having a Flory molecular weight of at least about 750 and polyethylene having a weight average Staudinger molecular weight of about 3000 to about 8000.

3. An improved paraffin wax composition comprising essentially paraffin wax and a total of about one to about 20 percent by weight of a rubbery isobutylene polymer having a Flory molecular weight of at least about 750 and polyethylene having a weight average Staudinger molecular weight of about 3000 to about 12,000, said isobutylene polymer and said polyethylene being present in a weight ratio of about 10:1 to about 1:10.

4. An improved paraffin wax composition comprising essentially paraffin wax and a total of about one to about 20 percent by weight of a rubbery isobutylene polymer having a Flory molecular weight of at least about 750 and polyethylene having a weight average Staudinger molecular weight of about 3000 to about 8000, said isobutylene polymer and said polyethylene being present in a weight ratio of about 10:1 to about 1:10.

5. An improved paraffin wax composition comprising essentially paraffin wax and a total of about one to about 20 percent by weight of a rubbery isobutylene polymer having a Flory molecular weight of at least about 750 and polyethylene having a weight average Staudinger molecular weight of about 3000 to about 12,000, said isobutylene polymer and said polyethylene being present in a weight average ratio of about 1:4 to about 4:1.

6. An improved paraffin wax composition comprising essentially paraffin wax and a total of about one to about 20 percent by weight of a rubbery isobutylene polymer having a Flory molecular weight of at least about 750 and polyethylene having a weight average Staudinger molecular weight of about 3000 to about 8000, said isobutylene polymer and said polyethylene being present in a weight average ratio of about 1:4 to about 4:1.

7. An improved paraffin wax composition consisting essentially of about 95 percent by weight of paraffin wax and about 5 percent by weight in approximately equal proportions of a rubbery isobutylene polymer and polyethylene having a weight average Staudinger molecular weight of between about 3000 and 8000.

8. An improved paraffin wax composition consisting essentially of about 95 percent by weight of paraffin wax and about 5 percent by weight in approximately equal proportions of rubbery isobutylene-diolefin copolymer and polyethylene having a weight average Staudinger molecular weight of between about 3000 and 8000.

References Cited in the file of this patent

UNITED STATES PATENTS

| | | |
|---|---|---|
| 2,339,958 | Sparks | Jan. 25, 1944 |
| 2,577,816 | Schneider | Dec. 11, 1951 |
| 2,582,037 | Hyde | Jan. 8, 1952 |
| 2,606,120 | Cherepow | Aug. 5, 1952 |
| 2,876,204 | Schneider et al. | Mar. 3, 1959 |

FOREIGN PATENTS

| | | |
|---|---|---|
| 585,812 | Great Britain | Feb. 27, 1947 |

OTHER REFERENCES

Industrial and Engineering Chemistry, August 1939, article by Fisher, page 941–942.

ICI "Alkathene," Tech. Bull. #5, November 1943, pages 2 and 4.

Richards: Industrial Chemist, page 186, March 1948.